Patented Jan. 6, 1948

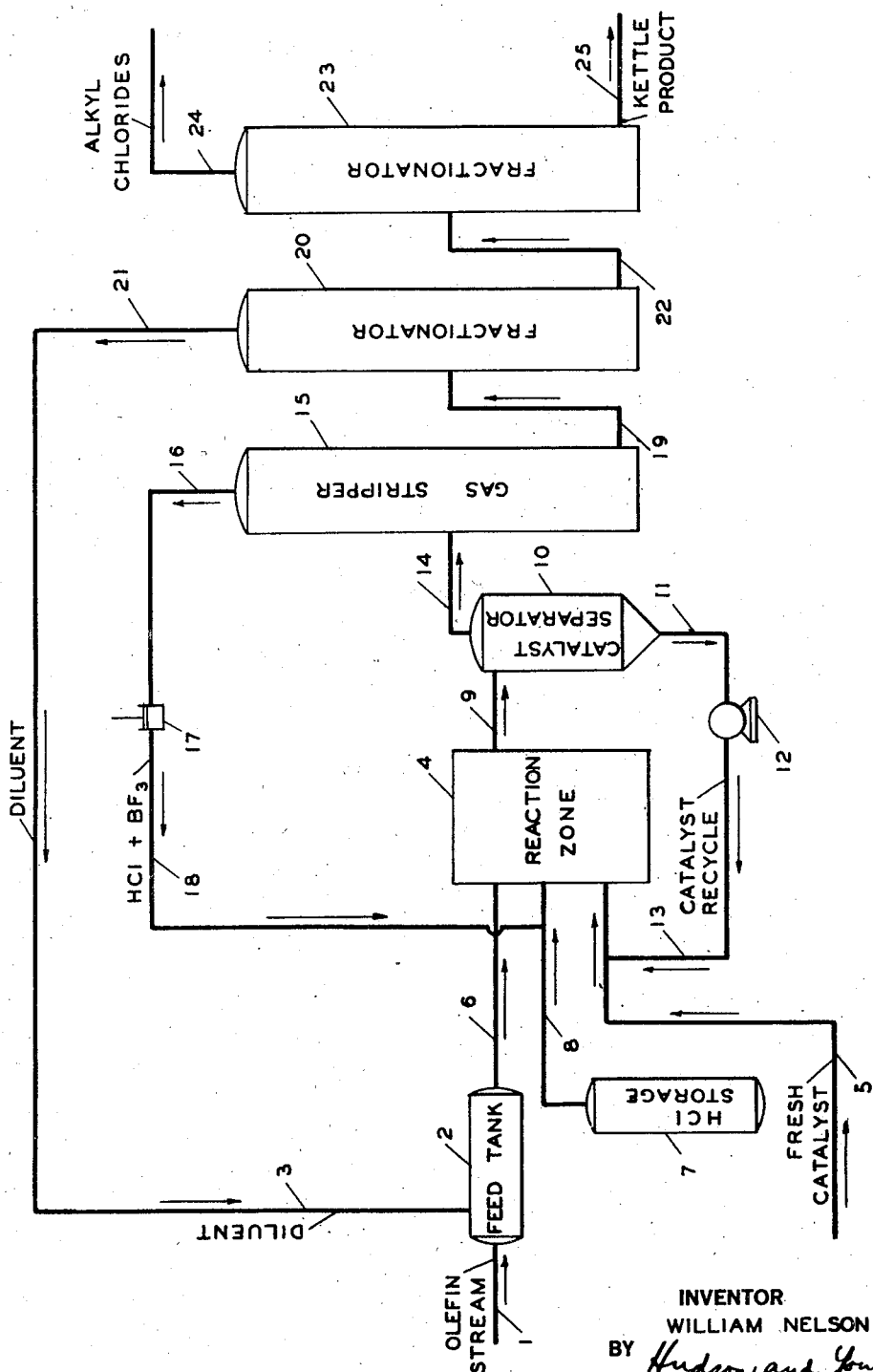

2,434,092

UNITED STATES PATENT OFFICE 2,434,092

PRODUCTION OF ALKYL CHLORIDES

William Nelson Axe, Bartlesville, Okla., assignor to Phillips Petroleum Company, a corporation of Delaware Application July 10, 1944, Serial No. 544,318

8 Claims. (Cl. 260—663)

This invention relates to a process for the conversion of olefinic hydrocarbons to alkyl chlorides. In one of its more specific aspects, the present invention relates to a process for the hydrochlorination of olefinic hydrocarbons under the influence of a novel catalytic agent comprising an addition compound of boron fluoride and phosphoric acid or other oxygen-containing acid of phosphorus.

Alkyl chlorides are a valuable class of organic intermediates which have long been employed in the classical Wurtz-Fittig, Friedel-Crafts and Grignard syntheses, as well as in industrial adaptations of such reactions. More recently, alkyl chlorides, especially those having relatively high molecular weights, have assumed increasing importance as primary intermediates for the production of alcohols, amines, mercaptans and the like. Since, in the past, alkyl chlorides were prepared from the corresponding alcohols, they could not be considered a source of alcohols. However, with the increasing availability of olefinic hydrocarbons from the petroleum industry, hydrochlorination processes have been adapted to produce specific monohalides for conversion to alcohols and for a variety of other applications. Such processes have attained considerable industrial significance and have made available at low cost a wider and more varied range of alcohols and other organic chemical products.

The addition of halogen acids or hydrogen halides to olefinic hydrocarbons is a well-established reaction. Of the hydrogen halides, hydrogen chloride is the most refractory of the group and adds to olefinic with the greatest difficulty. A variety of problems arise in attempting to effect the hydrochlorination of olefins. For example, isobutylene readily absorbs hydrogen chloride at atmospheric temperatures and pressure, whereas ethylene requires severe conditions and generally the presence of a catalyst to effect the addition reaction. Generally the more complex the molecular structure or configuration and the higher the molecular weight, the more readily does the olefin react with hydrogen chloride. Because of the wide variety and the severity of reaction conditions that may be required with particular olefins, the employment of catalysts in order to facilitate the reaction and reduce variations between the respective olefins is of considerable importance with respect to industrial exploitation of such hydrochlorination processes.

It is an object of this invention to provide a catalytic process for the production of alkyl chlorides from olefinic hydrocarbons and hydrogen chloride.

Another object of the invention is the provision of a novel catalyst composition comprising an addition compound of boron fluoride and an oxygen-containing acid of phosphorus that is adapted to promote the addition of hydrogen chloride to olefinic hydrocarbons.

A further object of the present invention is to provide an efficient catalytic process for the direct addition of hydrogen chloride to olefinic hydrocarbons under relatively mild reaction conditions that are generally similar for all olefins regardless of their molecular structure or configuration.

Other objects and advantages of the invention, some of which are referred to specifically hereinafter, will be obvious to those skilled in the art to which the invention pertains.

It has been found that the catalyst composition of this invention, which is exemplified by a composition comprising boron fluoride and phosphoric acid, is capable of catalyzing the addition of substantially anhydrous hydrogen chloride to olefinic hydrocarbons under extremely mild reaction conditions, for example, at such mild reaction conditions that the reactions do not proceed, for all practical purposes, in the absence of the catalyst. Thus, for example, representative olefins, isobutylene excepted, have been converted to alkyl chlorides at atmospheric temperatures and pressures, whereas, under the same conditions, but in the absence of the catalyst, no substantial amounts of alkyl chlorides were produced.

The hydrochlorination of olefins in the presence of a boron fluoride catalyst has heretofore been described. Boron fluoride is a normally gaseous substance which is not readily separable from hydrogen chloride. By the use of the normally liquid catalyst composition of the present invention, the amount of catalyst and its activity are more easily controlled, the catalyst is less difficult to handle and use, and the unreacted hydrogen chloride is more readily separated from the catalyst for reuse in the process.

While I have found that the preferred catalyst composition of my invention is capable of functioning as a hydrochlorination catalyst at atmospheric pressure, I prefer, in most instances, especially those involving continuous large-scale reactions, to use elevated pressures, in the interest of operational expediency. Ordinarily liquid-liquid contacting of catalyst and reactants is the preferred mode of operation. In its broader aspects, the present process involves the introduction of the olefin, an inert diluent and a stoichiometrical excess of hydrogen chloride with respect to olefin into the reaction zone containing the liquid boron fluoride-phosphoric acid catalyst. Sufficient pressure is maintained in the reaction zone to favor substantially complete solution of the hydrogen chloride while temperatures are ordinarily controlled at levels below approximately 150° F. The reactor may be of any conventional design which will insure thorough commingling of reactants and catalyst during the reaction period. The reactor-effluent, after gravity separation of the catalyst, is stripped of excess hydrogen chloride and fractionated to separate the diluent from the product alkyl chlorides.

A specific embodiment of the process of the present invention is illustrated by the procedure for the conversion of octenes into octyl chlorides that is represented on the accompanying drawing, which is a simplified flow diagram of such process. The olefin charge, which may comprise an octene ($C_8H_{16}$) fraction of commercial n-butenes-isobutene codimer, is introduced through conduit 1 into tank 2 where it is intimately blended with an equal volume of an inert diluent such as n-pentane entering the tank through conduit 3. Fresh catalyst comprising an addition compound of phosphoric acid and boron fluoride is charged to the reactor 4 through conduit 5. The hydrocarbon blend from tank 2 is charged under pressure through conduit 6 to reactor 4 while simultaneously anhydrous hydrogen chloride from storage tank 7 is transferred to the reaction zone 4 through conduit 8.

The hydrocarbon-catalyst volume ratio in reaction zone 4 may vary from approximately 10:1 to 20:1. The hydrogen chloride is charged at such a rate that a molecular excess of hydrogen chloride over olefin is maintained in the reaction zone at all times. The reaction is carried out under a pressure of approximately 500 to 600 pounds per square inch to insure substantial maintenance of liquid-liquid contacting between reactants and catalyst. The temperature in the reaction zone is preferably held at approximately 100° F. by means of any suitable conventional cooling installation (not shown on the drawing).

The emulsified effluent is discharged from reaction zone 4 through conduit 9 to separator 10, in which the catalyst phase is separated by gravity and recycled via conduit 11, pump 12, conduits 13 and 5 to reaction zone 4. The product phase from separator 10 is discharged through conduit 14 to gas stripper or stripping column 15, which is operated at atmospheric or a low superatmospheric pressure to remove substantially all free hydrogen chloride together with some boron fluoride. The hydrogen chloride stream is conducted by way of conduit 16 to compressor 17 and thence through conduit 18 to hydrogen chloride charge conduit 8. No separation of hydrogen chloride and boron fluoride is required, since the recycling of the boron fluoride serves to maintain catalyst activity. Ordinarily, it is desirable to include some boron fluoride in the hydrogen chloride charge when a new run is started until adequate boron fluoride in the recycle becomes available.

The kettle product from gas stripping column 15 is discharged via conduit 19 into fractionating column 20, where the pentane diluent is taken overhead through conduits 21 and 3 to the feed tank 2. The kettle product of column 20 comprising alkyl chlorides is taken through conduit 22 to fractionator 23, which is operated under diminished or subatmospheric pressure, to separate the product octyl chlorides from heavier materials including any hydrochlorinated heavy polymers. The octyl chlorides are transferred to storage through conduit 24 and the higher-boiling materials are withdrawn from fractionator 23 through conduit 25.

The preferred catalyst for use in the process of this invention may be prepared by treating orthophosphoric acid with anhydrous boron fluoride until complete saturation has been realized. The phosphoric acid which is used may range in concentration from the 85 per cent acid of commerce up to 100 per cent $H_3PO_4$, or aqueous solutions containing as little as 20 to 40 per cent $H_3PO_4$ may be employed. The readily available 85 per cent commercial acid yields a very satisfactory catalyst when saturated with boron fluoride. While orthophosphoric acid is preferred for the catalyst preparation, other oxy-acids of phosphorus, such as, for example, phosphorous acid ($H_3PO_3$) in aqueous solution, may also be utilized.

A chemical union, presumably the formation of a complex compound, occurs between boron fluoride and phosphoric acid. The product is a dense, fuming liquid at room temperature that has properties distinctly different from its original constituents. The combination takes place in the proportion of one molecule of boron fluoride to one molecule of phosphoric acid ($H_3PO_4$). If water is present in the phosphoric acid, the water also combines with boron fluoride in the molecular proportions of one of boron fluoride to one molecule of water. On saturating phosphoric acids of various concentrations, these proportions of boron fluoride are absorbed.

Since the preferred catalysts of this invention have strong polymerizing action on olefinic hydrocarbons, hydrochlorination reactions are preferably carried out with a molecular excess of hydrogen chloride with respect to olefin. Satisfactory reaction mixtures are those having molecular ratios of hydrogen chloride to olefin within the range from approximately 1:1 to approximately 6:1, with the intermediate range from 2:1 to 5:1 being in general preferred.

It is advantageous to employ an inert hydrocarbon diluent in the reaction of the present process. The presence of a diluent simplifies temperature control and the maintenance of an adequate molecular ratio of hydrogen chloride to olefin at relatively moderate pressures. Saturated normal paraffinic hydrocarbons, such as propane, n-butane and n-pentane, are ordinarily preferred diluents. The relative quantity of diluent used will depend on the type of operation and the olefin being reacted and may vary from approximately 10 to approximately 90 volume per cent of the total hydrocarbon feed.

Because of the high degree of activity displayed by the catalyst composition of this invention, moderate reaction temperatures may be employed with a wide variety of olefin feed stocks. In general, reaction temperatures within the range from approximately 32° F. to approximately 150° F. are adequate for the hydrochlorination of olefins extending from ethylene to those having 16 or more carbon atoms in the molecule. A more restricted temperature range of approximately 75° F. to approximately 150° F. is ordinarily preferred from the standpoint of temperature control.

Pressures of substantially atmospheric to approximately 1,000 pounds per square inch may be employed in the reaction zone. Because of the unusual activity of the boron fluoride-phosphoric acid catalysts it is possible to prepare a variety of alkyl chlorides at atmospheric pressure. The employment of elevated pressures, however, is beneficial with respect to catalyst life since the passage of excess hydrogen chloride through the reaction mixture tends to carry off free boron fluoride, thereby diminishing the activity of the catalyst. Pressures are generally selected which provide for substantial liquid-liquid contacting of the reactant and catalyst phases.

In order to further illustrate the specific uses and advantages of the present invention, the following exemplary operations are described. However, since these and numerous other process modifications will be obvious from the disclosure, no undue limitations are intended except as hereinafter imposed by the claims.

*Example I*

Ethyl chloride was prepared by the hydrochlorination of ethylene in the presence of propane under the catalytic influence of a catalyst consisting of a boron fluoride-phosphoric acid complex. A reactor of the turbo-mixer type having a nominal liquid capacity of approximately 2600 ml. and equipped with an external catalyst separator and a gravity-operated catalyst recycle line was used. Approximately 800 ml. of catalyst consisting of 85% phosphoric acid saturated with boron fluoride was charged to the reactor. The ethylene feed, comprising 14.7 per cent ethylene by weight in propane, was charged to the reaction zone by means of a pump. Anhydrous hydrogen chloride was metered to the reactor through a separate line at a rate adjusted to give a molecular ratio of hydrogen chloride to ethylene of approximately 2:1. The reactor pressure was maintained at 700 pounds per square inch gauge and the temperature was held at 115° to 130° F. by means of a water bath. Feed rates were regulated to give a total effluent rate of approximately 5.5 liters per hour.

The total effluent was charged to a stabilizing still operated at a pressure of approximately 300 to 350 pounds per square inch gauge, from which hydrogen chloride and traces of boron fluoride were taken overhead while maintaining a propane total reflux. After removal of the inorganic halogen compounds, the propane was taken overhead to yield a crude stabilized product. Fractionation of the alkyl chlorides was carried out under a pressure of about one atmosphere to give an ethyl chloride distillate and a kettle product comprising higher-boiling chlorides.

Substantially complete reaction of the ethylene was realized. Approximately 95 per cent of the ethylene was converted to ethyl chloride and 5 per cent formed polymerization and hydrochlorinated polymeric products.

*Example II*

Addition of hydrogen chloride to trimethylethylene was accomplished in the presence of a boron fluoride-phosphoric acid catalyst at atmospheric pressure. The reaction was carried out in a 2-liter glass flask equipped with a mechanical stirrer. The reaction vessel was charged with 300 ml. of n-pentane and 25 ml. of a catalyst similar to that described in Example I. While maintaining a good catalyst-hydrocarbon emulsion, trimethylethylene and a stoichiometrical excess of hydrogen chloride were introduced simultaneously into the reaction zone. The reaction temperature was held at 80° to 100° F. After the addition of 200 ml. of olefin, the hydrocarbon phase was subjected to fractional distillation.

Approximately 75 per cent of the trimethylethylene was converted to completely saturated alkyl chlorides, while the remainder was recovered as a mixture of polymeric material admixed with high-boiling chlorides. Tertiary amyl chloride was recovered in substantial yield.

An experiment carried out under substantially identical reaction conditions without a catalyst failed to yield any substantial amount of alkyl chlorides. The entire depentanized reactor charge distilled at 90° to 95° F., which is the boiling range of the trimethylethylene employed.

*Example III*

The hydrochlorination of 1-pentene was effected in the presence of a boron fluoride-phosphoric acid catalyst at atmospheric pressure and at a temperature range of 80° to 100° F. A catalyst similar to that described in Example I and the batch procedure of Example II were employed and a paraffinic hydrocarbon fraction having an end point of 300° F. was used as the diluent. In this instance the 1-pentene was substantially completely converted to secondary amyl chloride.

An experiment was carried out under substantially identical reaction conditions in the absence of the catalyst with no evidence of reaction being observed. Fractional distillation of the treated material resulted in substantially complete recovery of the 1-pentene.

*Example IV*

The catalytic addition of hydrogen chloride to diisobutylene was effected at atmospheric pressure using a boron fluoride-phosphoric acid catalyst. The catalyst and reaction procedure were substantially the same as those described in Example II. The diisobutylene was added to the reactor at a rate of approximately 32 g. per hour and the hydrogen chloride was metered into the reaction mixture at a rate of approximately 22 g. per hour. A total of 287 g. of olefin was added. The reaction temperature was maintained at 70° to 84° F. The total crude depentanized product was substantially saturated.

Fractional distillation of the reaction product under pressure gave the following product distribution:

| | Per cent by weight |
|---|---|
| Low-boiling alkyl chlorides | 5.0 |
| Octyl chlorides | 89.0 |
| Higher-boiling chlorides | 6.0 |

The attempted addition of hydrogen chloride to diisobutylene under the above conditions and in the absence of a catalyst resulted in failure. The depentanized material had a bromine number of 120, as compared with 126 for the original olefin feed, and negative tests for chloride were obtained by the sodium fusion method.

*Example V*

A mixture of dodecyl chlorides was prepared by treating a fraction of $C_{12}$ olefins obtained from the high-boiling by-products of a refinery codimerization of normal and isobutenes with anhydrous hydrogen chloride in the presence of an inert diluent and a boron fluoride-phosphoric acid catalyst. The reaction was carried out in a 2-liter Pyrex glass flask equipped with a mechanical stirrer. The olefin feed and hydrogen chloride were added to an emulsion of 25 ml. of a catalyst, similar to that described in Example I, in 600 ml. of n-pentane diluent. The olefin was added at a rate of 145 liquid ml. per hour and sufficient hydrogen chloride was metered to the reaction to maintain a stoichiometrical excess of the latter, at least during the initial contacting with the catalyst.

The depentanized product was a substantially saturated, water-white liquid having a specific gravity of 0.83 at 60 F. The product was unstable at temperatures above approximately 200° F., evolving copious quantities of hydrogen chloride and liberating heat during the decomposition.

The catalytic efficiency of the boron fluoride-phosphoric acid complex was substantiated by results obtained from the noncatalytic treatment of the above olefin fraction with anhydrous hydrogen chloride. Some polymerization of the olefin occurred, but qualitative tests revealed the treated product to be substantially free of combined chloride.

Although the present invention has been described in detail with respect to specific modifications, various other alternative procedures will be apparent to those skilled in the art to which the invention pertains. No undue restrictions are thereby intended since the scope of the invention is to be limited solely by the appended claims.

I claim:

1. A process for the production of an alkyl chloride which comprises reacting an olefinic hydrocarbon with substantially anhydrous hydrogen chloride in the presence of a catalyst comprising a boron fluoride addition product formed by substantially saturating an acid selected from the group composed of ortho-phosphoric and phosphorous acids with boron fluoride.

2. A process for the production of an alkyl chloride which comprises reacting an olefinic hydrocarbon with substantially anhydrous hydrogen chloride in the presence of a catalyst comprising a boron fluoride addition product formed by substantially saturating orthophosphoric acid with boron fluoride.

3. A process for the production of an alkyl chloride which comprises passing an olefinic hydrocarbon having from 2 to 16 carbon atoms in the molecule and a stoichiometric excess of substantially anhydrous hydrogen chloride into contact with a catalyst comprising an addition product formed by substantially saturating 85 per cent ortho-phosphoric acid with boron fluoride, under pressure sufficient to maintain substantially complete solution of hydrogen chloride.

4. A process for the production of an alkyl chloride which comprises passing an olefinic hydrocarbon having from 2 to 16 carbon atoms per molecule and substantially anhydrous hydrogen chloride in olefin to hydrogen chloride stoichiometric ratio of from 1:1 to 1:6 at a temperature in the range from 32° to 150° F. and under pressure sufficient to maintain substantially complete solution of hydrogen chloride into contact with a catalyst comprising a normally liquid addition product formed by substantially saturating ortho-phosphoric acid with boron fluoride.

5. A process for the production of ethyl chloride which comprises passing a mixture comprising ethylene and hydrogen chloride in the molecular ratio of approximately 1 mol of ethylene to 2 mols of hydrogen chloride into contact with a catalyst in a reaction zone, said catalyst comprising a normally liquid addition product formed by substantially saturating 85 per cent ortho-phosphoric acid with boron fluoride; maintaining a temperature in said reaction zone in the range from 115° to 130° F.; and maintaining a pressure therein of approximately 700 pounds per square inch gauge.

6. A process for the production of tertiary amyl chloride which comprises passing a mixture comprising trimethylethylene and hydrogen chloride, in which the hydrogen chloride is in stoichiometric excess, into contact with a catalyst in a reaction zone, said catalyst comprising a normally liquid addition product formed by substantially saturating 85 per cent ortho-phosphoric acid with boron fluoride; maintaining a temperature in said reaction zone in the range from 80° to 100° F.; and maintaining substantially atmospheric pressure in said reaction zone.

7. A process for the production of an octyl chloride which comprises passing diisobutylene together with a stoichiometrical excess of hydrogen chloride into contact with a normally liquid addition product consisting of approximately 85% orthophosphoric acid substantially completely saturated with boron fluoride while maintaining a reaction temperature within the range of approximately 70° to approximately 84° F.

8. A process for the production of an alkyl chloride which comprises passing a mixture comprising a $C_5$ olefin and hydrogen chloride, in which the hydrogen chloride is in stoichiometric excess, into contact with a normally liquid addition product consisting of approximately 85% orthophosphoric acid substantially completely saturated with boron fluoride while maintaining a reaction temperature within the range of 80° to 120° F.

WILLIAM NELSON AXE.

REFERENCES CITED

The following references are of record in the file of this patent:

UNITED STATES PATENTS

| Number | Name | Date |
|---|---|---|
| 2,103,692 | Piotrowski et al. | Dec. 28, 1937 |
| 2,140,507 | Chamberlain et al. | Dec. 20, 1938 |
| 2,186,916 | Wiezevich | Jan. 9, 1940 |

OTHER REFERENCES

Kastner, "Angewandte Chemie," vol. 54, page 273 (1941).

Certificate of Correction

Patent No. 2,434,092.  January 6, 1948.

WILLIAM NELSON AXE

It is hereby certified that errors appear in the printed specification of the above numbered patent requiring correction as follows: Column 7, line 14, for "60 F." read *60° F.*; column 8, line 25, for "produced" read *product*; and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.*